Nov. 17, 1959   L. H. HASKIN, JR   2,912,926
STAMP PRINTING APPARATUS
Filed Oct. 5, 1956   7 Sheets-Sheet 1
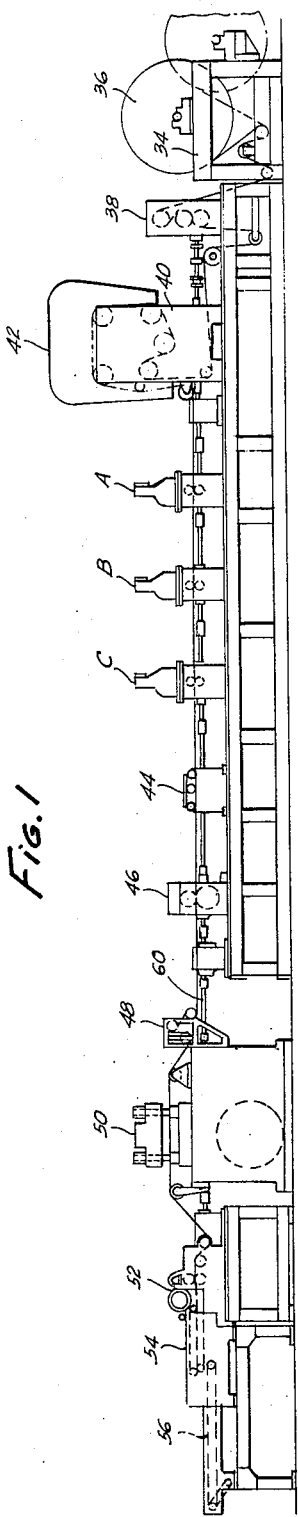
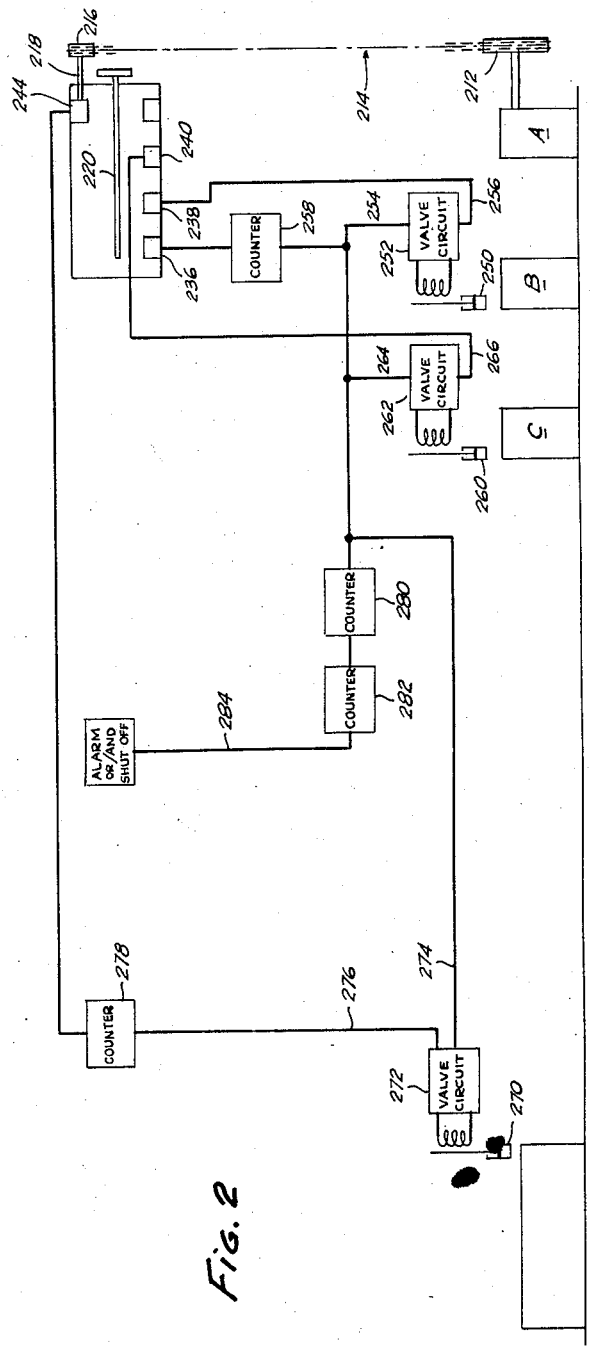
INVENTOR
LAWRENCE H. HASKIN, Jr.
BY James and Franklin
ATTORNEYS.

Nov. 17, 1959 L. H. HASKIN, JR 2,912,926
STAMP PRINTING APPARATUS
Filed Oct. 5, 1956 7 Sheets-Sheet 3
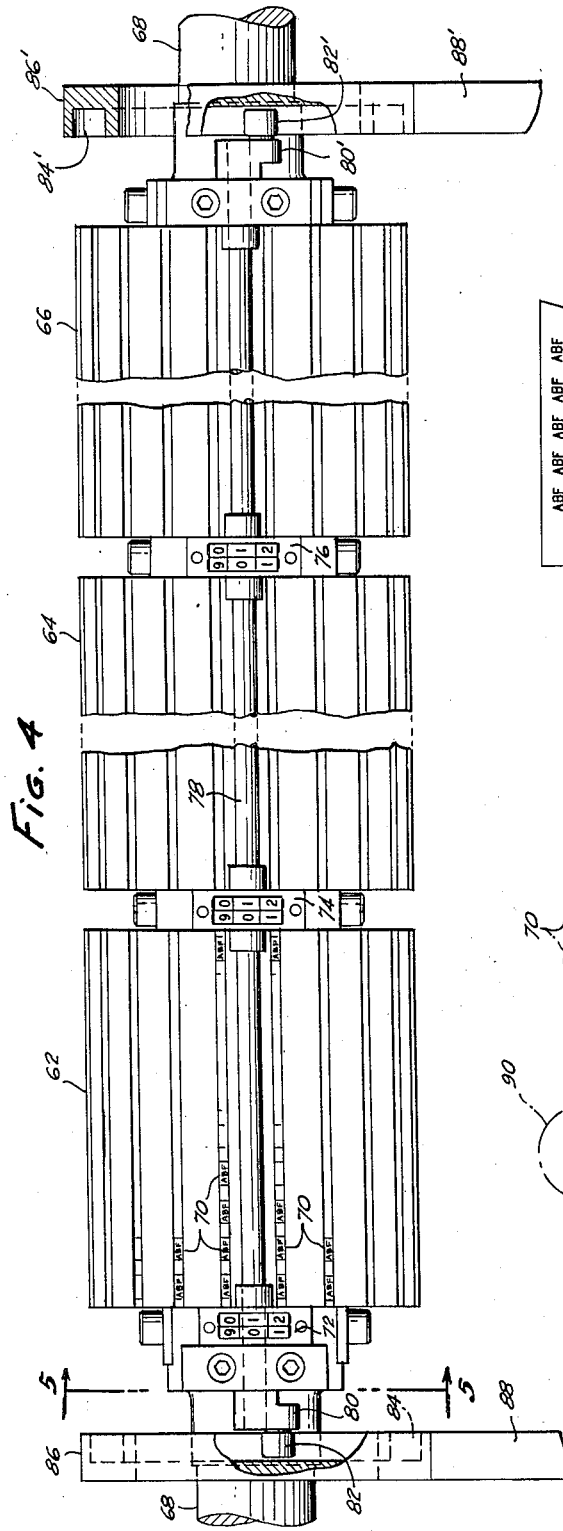
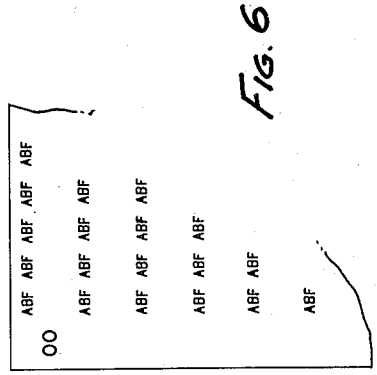
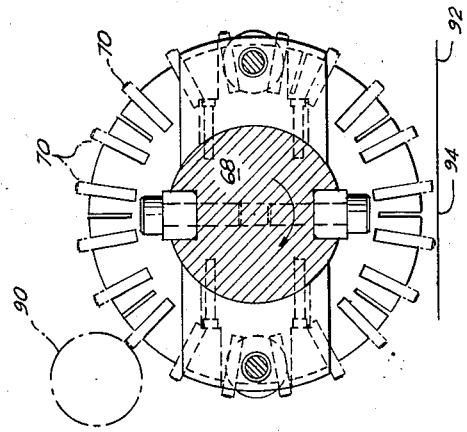
INVENTOR
LAWRENCE H. HASKIN, Jr.
BY James and Franklin
ATTORNEYS.

Nov. 17, 1959   L. H. HASKIN, JR   2,912,926
STAMP PRINTING APPARATUS
Filed Oct. 5, 1956   7 Sheets-Sheet 4
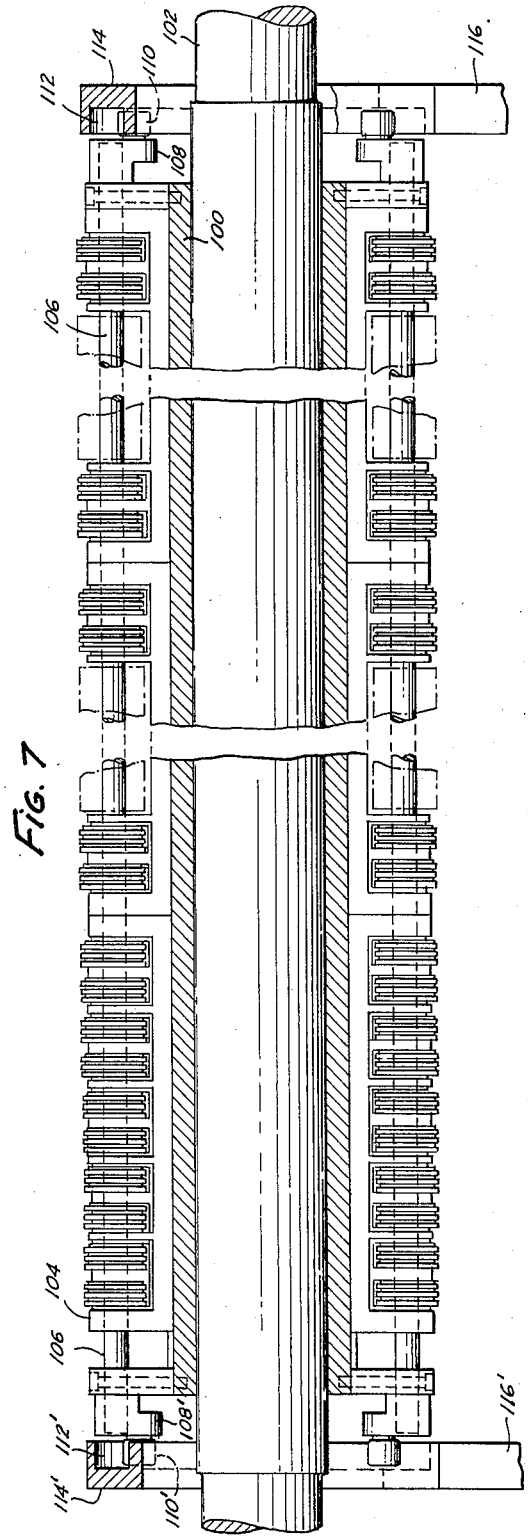
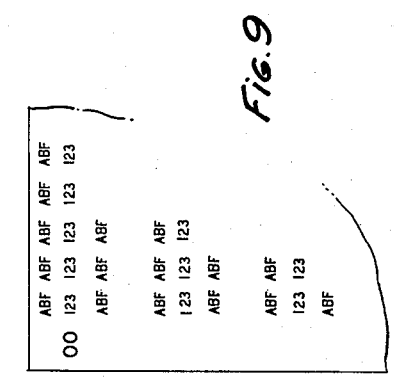
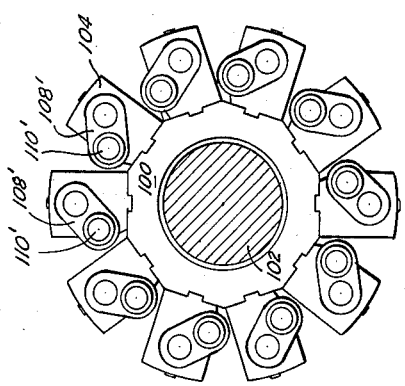
INVENTOR
LAWRENCE H. HASKIN, Jr.
BY James and Franklin
ATTORNEYS.

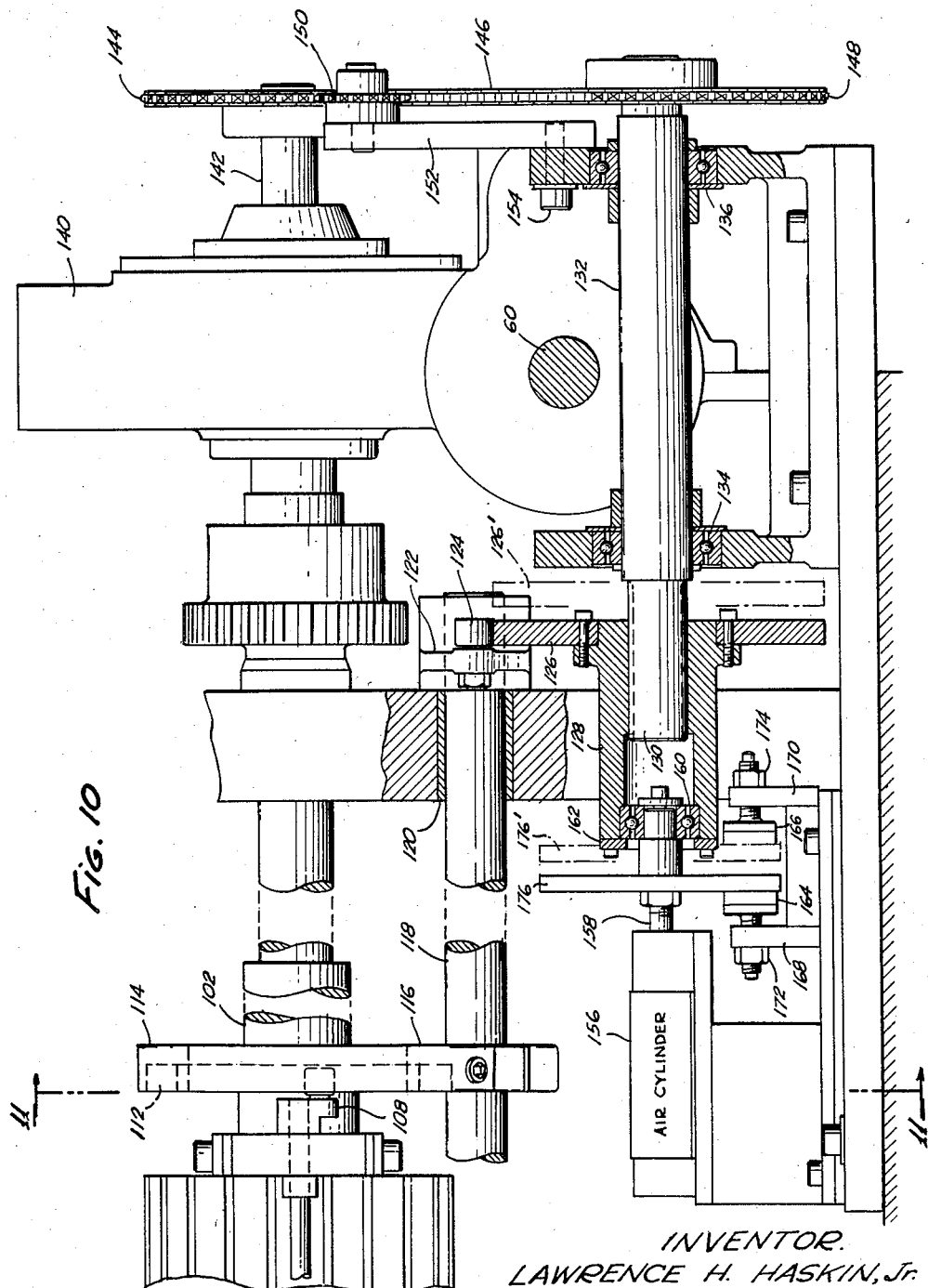

Nov. 17, 1959   L. H. HASKIN, JR   2,912,926
STAMP PRINTING APPARATUS
Filed Oct. 5, 1956   7 Sheets-Sheet 6

INVENTOR
LAWRENCE H. HASKIN, Jr.
BY James and Franklin
ATTORNEYS.

Nov. 17, 1959   L. H. HASKIN, JR   2,912,926
STAMP PRINTING APPARATUS
Filed Oct. 5, 1956   7 Sheets-Sheet 7

INVENTOR
LAWRENCE H. HASKIN, Jr.
BY James and Franklin
ATTORNEYS.

United States Patent Office 2,912,926
Patented Nov. 17, 1959

2,912,926

STAMP PRINTING APPARATUS

Lawrence H. Haskin, Jr., Claremont, N.H., assignor to Champlain Company, Inc., Bloomfield, N.J., a corporation of New York Application October 5, 1956, Serial No. 614,142

20 Claims. (Cl. 101—76)

This invention relates to printing apparatus, and more particularly to rotary apparatus for high speed printing of shopping stamps.

Shopping stamps are small, and ordinarily provided in pages of 100 stamps each, perforated to facilitate tearing apart the individual stamps. A quantity of pages, say 100, are bound into a book of stamps. An enormous quantity of such books of stamps are printed, and involve considerable premium or redemption value. It is desirable to be able to trace the travel of the stamps, partly in order to avoid theft or leakage in the course of distribution, and partly in order to check the popularity of the stamps in different geographic areas, or different chains, or even in individual stores of a particular chain, etc.

It is, therefore, advantageous to be able to identify the stamps by books, and for this purpose the stamps may be printed with serial numbers identifying those from individual books of a series, and with letters to identify the series. Assuming the use of serial numbers with three digits from 000 to 999, each series would comprise 1000 books, and each series may have different identifying letters, for example, ABF, ABG, ABH, etc. Three letters will identify many thousands of series.

The primary object of the present invention is to generally improve printing apparatus for printing such identifying characters on sheets of stamps. A more particular object is to perform the printing operation while printing on a continuous web by means of high speed rotary printing apparatus, without requiring stopping or slowing of the web when changing from one serial number to the next.

For this purpose, the printing cylinder carries axially extending lines of numbering units around its periphery, each numbering unit consisting of, say, three digit wheels. However, the individual stamps are so small in dimension, say, ½" x ¾", that it would be difficult to locate the numbering units sufficiently closely around the cylinder. In accordance with a further feature and object of the invention, the first printing cylinder prints alternate stamps, while a succeeding printing cylinder prints the intermediate stamps, thereby doubling the space available on the cylinder for the mounting of printing units. At the completion of a desired number of pages for one book, say 100 pages, the printing units are all advanced one digit, but they are not advanced simultaneously, but rather sequentially. In accordance with an object of the present invention, the change is made in only a small fraction of one rotation of the cylinder, the change being made after the unit has printed a stamp, and before inking of the unit begins. Also, appropriate phasing means is provided to compensate for the displacement along the length of the web of one cylinder from the other.

Other printing mechanism is employed to print serial letters, and to print page numbers on the individual sheets of stamps for a single book, and here again phase compensation is provided, so that each change in serial number will correspond to the actual page numbering for the complete book.

In preferred form the apparatus includes not only the printing units, but also a slitter to trim and slit the web to individual page width, a perforator to outline the individual stamps, a cutter to cut the continuous web into pages, and a stacker to stack the cut pages in stacks corresponding to books. The first stack is moved away when completed in order to begin the piling of a second stack. This requires conformity with the page numbers, but here again the problem of phasing arises, for the entire press line may be so long as to involve a displacement of many pages between the first printing press and the stacker. A further object of the present invention is to overcome this difficulty, for which purpose another phasing means is provided which includes also a counter.

To accomplish the foregoing objects, and other more specific objects which will hereinafter appear the invention resides in the stamp printing elements and their relation one to another, as are hereinafter more particularly described in the following specification. The specification is accompanied by drawings in which:

Fig. 1 is an elevation of a press line embodying features of the invention;

Fig. 2 is a schematic diagram explanatory of the method of phasing the units of the press line;

Fig. 4 is a plan view of a press cylinder for page numbering and for printing serial letters;

Fig. 5 is a section taken in the plane of the line 5—5 of Fig. 4;

Fig. 6 is a fragmentary part of a page printed by the cylinder of Figs. 4 and 5;

Fig. 7 is a longitudinal section showing a printing cylinder for printing serial numbers;

Fig. 8 is an end view of the same;

Fig. 9 shows a fragment of a page printed by the cylinder shown in Figs. 7 and 8;

Fig. 10 is a partially sectioned fragmentary transverse view explanatory of mechanism to advance the setting of the numbering units of the cylinder shown in Figs. 7 and 8;

Figure 12:
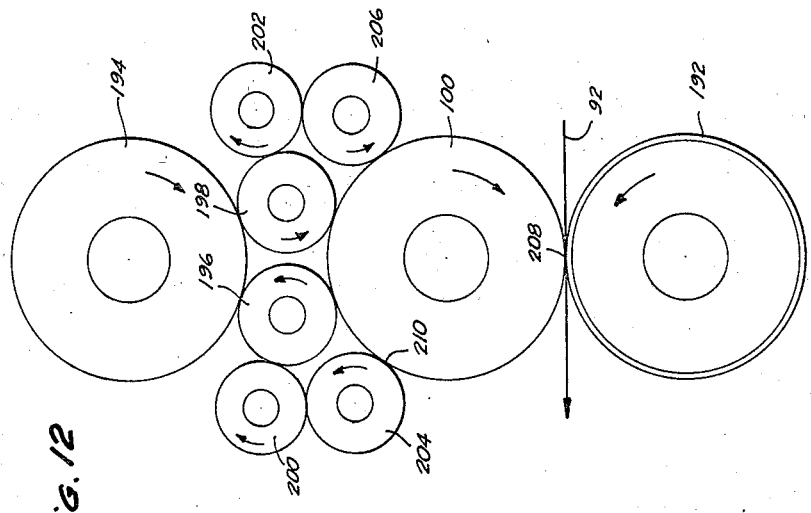
Figure 13:
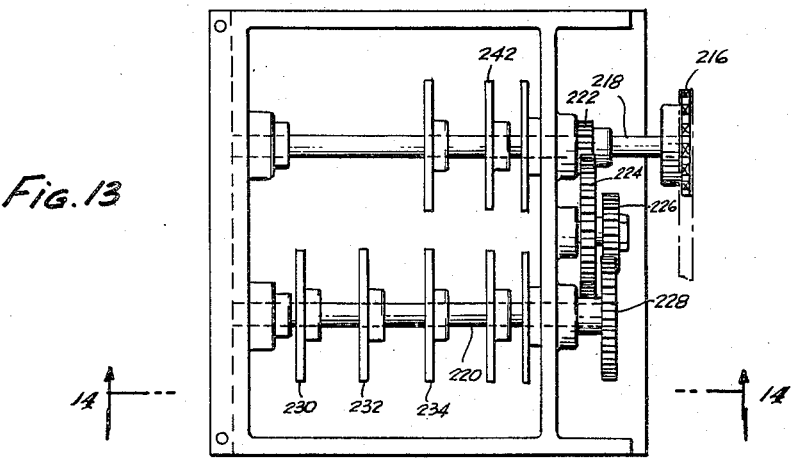
Figure 14:
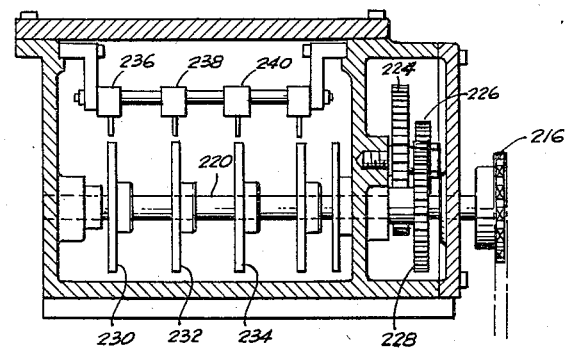
Figure 15:
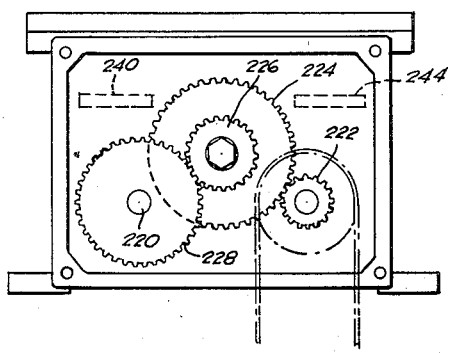

Fig. 12 schematically represents a part of the inking system;

Fig. 13 is a plan view of a cam system used for operating phasing switches forming a part of the apparatus;

Fig. 14 is a transverse section taken approximately in the plane of the line 14—14 of Fig. 13;

Fig. 15 is an end view showing the gearing of the phasing mechanism; and

Figure 16:
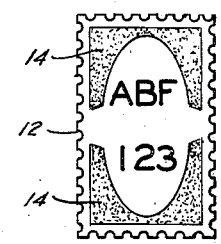

Fig. 16 shows a single stamp drawn to enlarged scale.

Referring to the drawing, and more particularly to Fig. 16, the individual stamp 12 is a shopping stamp having the usual serrated edge resulting from tearing along lines of perforations, and having a complex engraved background indicated at 14. This is preferably provided by gravure printing in one color, say, black, while serial letters and serial numbers are printed in another color, say, red. As here used, the serial letters signify a series of books, say, 1000 books, while the serial numbers signify one book of the series.

Figure 3:
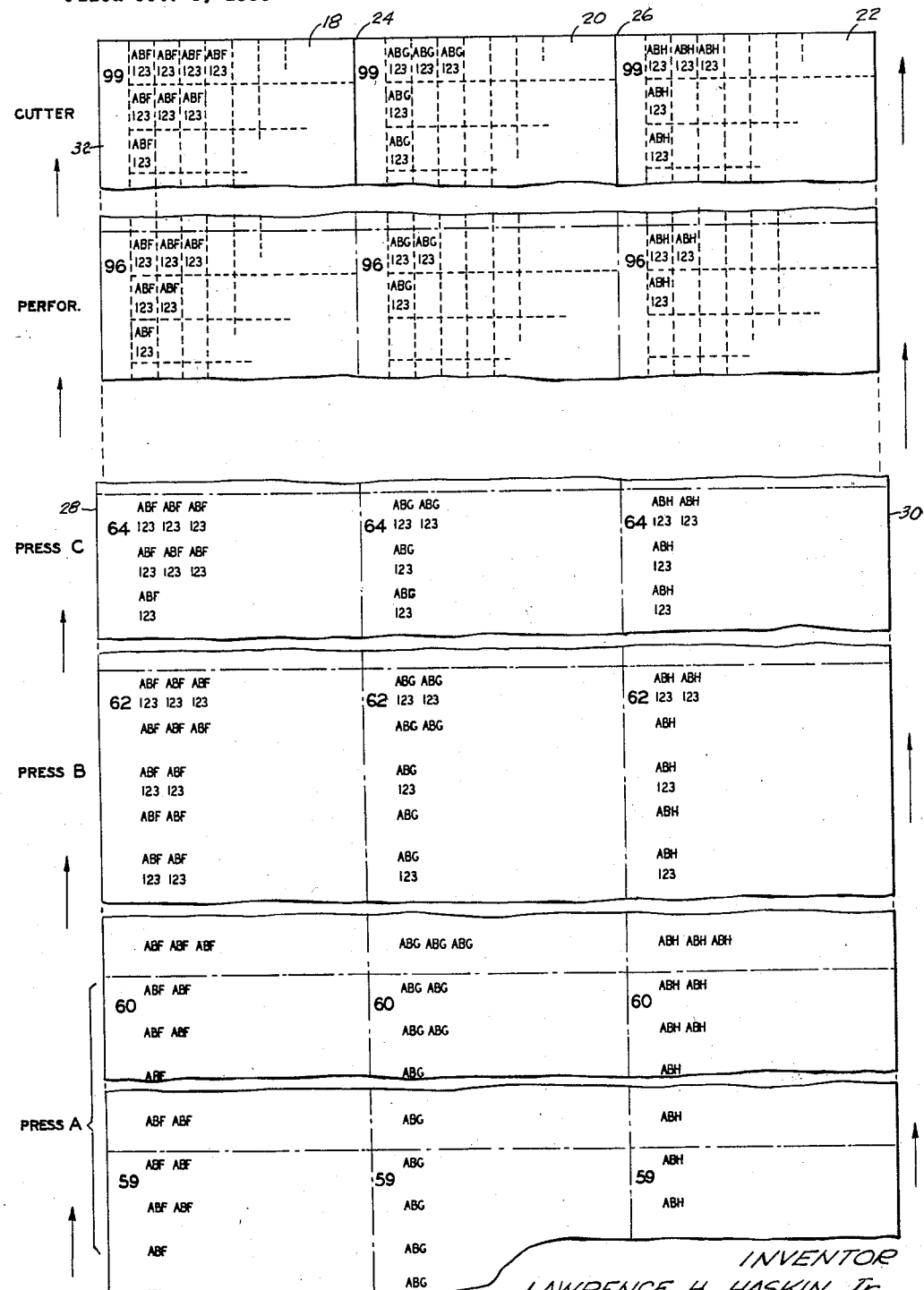
Fig. 3 shows fragmentary sections of web to illustrate some of the operations thereon.

Referring now to Fig. 3, the printing operation is preferably performed on a continuous wide web. In the present case, the web is three pages wide, there being lines of pages 18, 20 and 22, separated by slit lines 24 and 26. Additional slit lines may trim away the edge shown at 28 and 30. The pages ordinarily are ten stamps long and ten stamps wide, each containing one hundred stamps. There is an additional lefthand margin 32 for binding the pages into books, and the individual pages are preferably numbered, as indicated in the upper left corner of each page.

Referring now to Fig. 1 of the drawing, the complete press line in the present case comprises any suitable reel carrier or paper roll support mechanism 34, carrying one or more paper rolls 36, which may be unwound by a suitable pull unit 38, and then fed through a conventional gravure printing press 40, having a dryer 42. At this time, the background engraving (shown at 14 in Fig. 16) is printed on the web, following which the web passes through first, second and third letter press units marked A, B and C in Fig. 1. As here employed, press A prints the page numbers and serial letters, as shown at the bottom of Fig. 3 and also in Fig. 6, the printnig cylinder being shown in Figs. 4 and 5.

In Fig. 3, it will be observed that the page numbering is the same for the three sheets across the web, but that the serial letters are different, the first line of sheets being printed ABF, the second ABG, and the third ABH. Thus the web makes up three series of books, and with three digits for the serial number there will be 1000 books for each series. The page numbering is in reverse order, as explained later.

Press B (Fig. 1) prints the serial number of alternate stamps, as shown for page 62 in Fig. 3, and also in Fig. 9, the printing cylinder being that shown in Figs. 7 and 8. Press C (Fig. 1) prints the serial number of the remaining or intermediate stamps, as shown at page 64 in Fig. 3.

Continuing with Fig. 1, press C is followed by a dryer 44 and a pull unit 46. This is followed by a slitter 48, and a perforator 50. The web then goes to a cutting unit 52, which cuts the slit web into individual sheets. These are transferred by transfer belts 54 to a stacking belt 56, on which the sheets are stacked for a desired number, say one hundred sheets, whereupon belt 56 is moved to separate a finished stack from the next succeeding stack. All of the units along the press line are driven in synchronism by means of a common drive shaft 60, extending longitudinally of the press line. An appropriate registration means, preferably a running register means, is interposed between the main drive 60 and the individual units, in order to facilitate proper longitudinal registration of the engraving, the printing, the perforating and the cutting. The slitting operation is shown in Fig. 3 by the change from page 64 to page 96.

The lines of perforation formed by the perforator are represented in dotted lines on pages 96 and 99.

Referring now to Figs. 4 and 5 of the drawing, the cylinder of the press A consists of three sections 62, 64 and 66, carried on and driven by a common shaft 68. The sections are slotted to receive fixed letters indicated at 70 in Fig. 5. Only a few of these inserts are shown at 70 in Fig. 4, but in practice the entire cylinder is filled. No attempt is made to change the serial letters automatically, and at the end of the printing of 3000 books of one hundred pages each, the press line is shut down, the cylinder is removed, and the letters of the cylinder are changed manually.

The same cylinder is also used for page numbering, and for this purpose the shaft 68 between the sections 62, 64 and 66, is provided with numbering units 72, 74 and 76. Each unit comprises two digit wheels, one for integers and the other for tens, and these are interconnected in conventional fashion by Geneva or other such mechanism, so that each full rotation of the first wheel moves the second wheel one digit. The first wheel is advanced by a common operating shaft 78 extending for the length of the cylinder, and carrying an operating arm 80 with a cam roller 82. This is received in the cam groove 84 of an annular cam 86 surrounding the shaft 68. It will be understood that by appropriate shaping of the cam groove 84, or by mounting it eccentrically by its support arm 88, the numbering units may be operated once for each revolution of the cylinder.

Because of the length of the shaft 78, it preferably is provided with operating arms and cams at both ends, and in the present case, the arm 80', cam roller 82', cam groove 84', cam 86', and cam support 88', all correspond to the similarly numbered parts at the other end of the cylinder.

The cylinder is large enough in diameter to print two successive pages. Thus, referring to Fig. 5, it will be seen that a single page of ten stamps is printed by half the cylinder, and a next page of ten stamps is printed by the opposite half of the cylinder. There are, accordingly, two sets of numbering units at diametrically opposite points. These are the same as previously described, and are operated by shafts and operating arms like those already described. Each numbering unit need be operated only once in each revolution of the cylinder and the same cam groove suffices for both numbering units.

However, one precaution must be taken. The initial setting of the numbering unit on one side differs from that on the other, so that if one side prints 00, the opposite side should print 01. Thus, the units at one side print only odd numbers, and those on the other side, print only even numbers. To accomplish this, the cam displacement must be such as to move the first digit wheel of the numbering unit two digits instead of one for each rotation of the cylinder. Of course, the tens wheel moves only one digit at a time, and it is moved after five of the double movements of the integer wheel.

Alternatively, the cam might be shaped to move the integer wheel one step, but with two cam rises to produce two movements in each rotation of the cylinder. However, a single large movement is preferred in order to advance the numbering unit to its new position before encountering the ink rolls, so that the ink will be applied to the new number next to be printed. In the particular letter press here shown, the first of a series of ink rolls is encountered after about one-third of a rotation from the printing point, that is, approximately as indicated by the roll 90 in Fig. 5 following printing of web 92 at the point 94.

The cylinders 62, 64 and 66 are secured to shaft 68 in any desired fashion. The numbering units are carried on split arms secured to the shaft between the cylinders.

Referring now to Figs. 7 and 8, the printing cylinder 100 is secured to a shaft 102. The cylinder has ten accurately machined faces, each preferably grooved to facilitate accurate mounting thereon of sections of numbering machines or units 104. The numbering units are secured to cylinder 100 by long screws passing radially through the ends of the numbering unit frames and into the cylinder 100. Each numbering unit has three digit wheels, and these are inter-connected by the usual Geneva or like mechanism, so that only the first digit wheel need be actuated.

The particular numbering units here shown are made by Wetter Numbering Machine Co. of New York, and are of the so-called center driven type, that is, the shaft 106 which actuates appropriate concealed pawl and ratchet mechanism for advancing the first digit wheel step by step, passes concentrically through the digit wheels. Similar remark is applicable to the page numbering units shown in Figs. 4 and 5.

As before, the operating shafts 106 extend the entire length of the cylinder, and carry an operating arm 108 with a cam roller 110 received in the cam groove 112 of an annular cam 114 carried by a support arm 116. Because of its length, the shaft 106 preferably has similar operating means at both ends, this being indicated by the corresponding primed numerals 108', 110', etc. The arms 108' and cam rollers 110' are clearly shown also in Fig. 8.

However, it must be kept in mind that the numbering units are to remain unchanged for one entire book, or one hundred pages, and, therefore the operating arms 108 are to be operated only at long intervals. For this purpose, the annular cam groove 112 may be made circular and mounted concentrically of shaft 102, the cams then being displaced radially by means of the support arms 116, 116' after counting off the desired number of pages.

Figure 11:
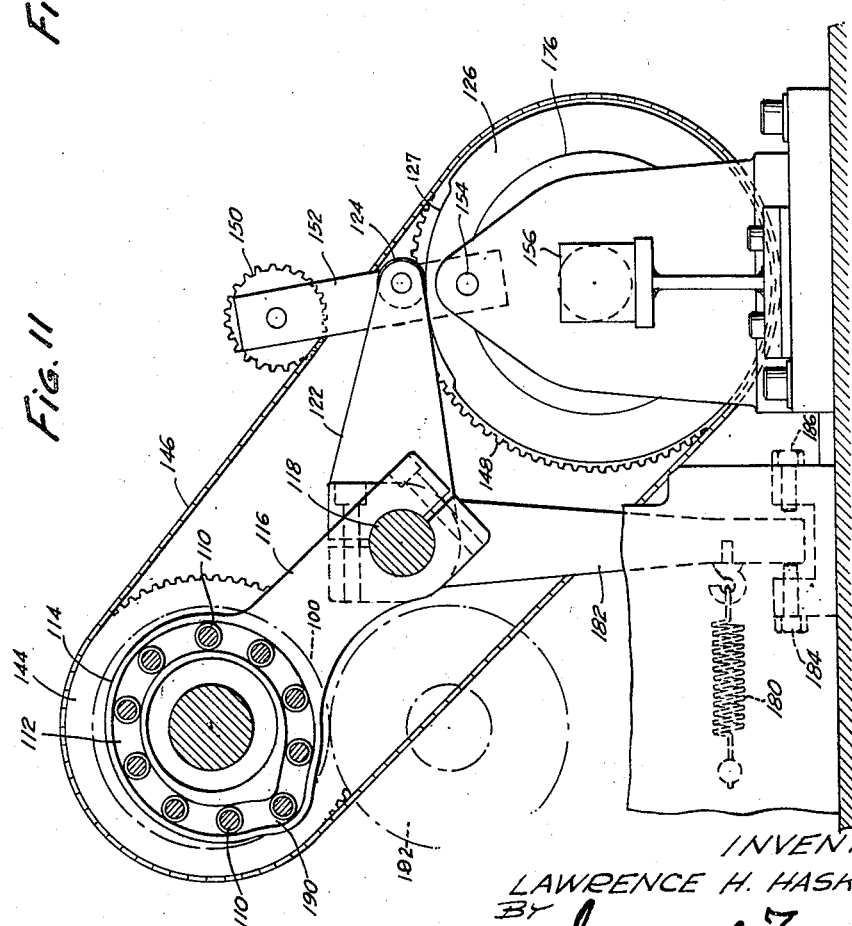
Fig. 11 is a partially sectioned view taken approximately in the plane of the line 11—11 of Fig. 10.

A mechanism for this purpose is shown in Figs. 10 and 11, referring to which the annular cam 114 is carried by arm 116 mounted on a rock shaft 118, journaled at 120. This in turn carries a cam follower arm 122 with a cam roller 124, the latter cooperating with an axially shiftable cam 126, which may be moved axially between an operative position shown in solid lines, and an inoperative position shown in broken lines at 126' (Fig. 10).

The cam 126 is mounted on a hub 128 which is splined at 130 to a shaft 132 journalled in bearing 134, 136, and driven by the printing cylinder shaft 102. More specifically, the printing cylinder shaft is itself driven by the main line shaft 60, which through a suitable running register mechanism housed at 140, drives a shaft 142 which is coaxial with and connected to the printing cylinder shaft 102. Shaft 142 carries a sprocket wheel 144 driving a chain 146 which in turn drives a sprocket wheel 148 on shaft 132. The chain may be kept taut by means of an idler sprocket 150 carried on an arm 152 pivoted at 154.

Cam 126 and hub 128 are shifted axially by means of an air cylinder 156. Its piston moves a piston rod 158 connected to a bearing 160 locked in hub 128 by means of a ring 162. Rod 158 may be used to shift hub 128 axially, without in any way impeding free rotation of hub 128 with its driving shaft 132. The axial motion may be limited by means of adjustable stops 164, 166, the threaded shanks of which are received in supports 168, 170, and locked by nuts 172, 174. Rod 158 carries a plate or disc 176, which is received between the stops 164, 166. The disc moves between the solid line position 176 and the broken line position 176', with corresponding motion at the cam 126 to the broken line position 126'.

In order to afford time for axial shifting of the cam 126 it is preferably turned a little slower than the print cylinder. In the present case the sprocket wheels 144, 148 have a 4:5 ratio, and thus four-fifths of the periphery of cam 126 may be used to radially offset or displace the annular cam 114. This will correspond to one complete revolution of the printing cylinder, and will insure operation (once each) of all of the operating arms of the numbering units. The remaining one-fifth of the cam 126 provides a period during which the cam may be shifted axially from its idle position 126' to its working position 126, and then back again after it has done its work.

Referring now to Fig. 11, the cam 126 is of uniform radius for four-fifths of its periphery, and is of reduced radius in the remaining portion 127. The annular cam 114 is normally urged to inoperative position by means of a pull spring 180, connected to an arm 182 mounted on rock shaft 118. The motion of arm 182 may be nicely adjusted by means of threaded stops 184, 186. The reduced radius portion of cam 126 readily slides axially beneath the cam roller 124, even when the latter is in the lowered position permitted by stop 184.

As so far described the cam groove of cam 114 would be ciruular, and it would normally remain concentric with the printing cylinder. However, the change of number setting must be made exceedingly rapidly, and I have found that this desired result is greatly expedited by causing the cam 114 to move the operating arms 108 (Figs. 7 and 8) partly but not fully enough to advance the setting of the numbering units. Indeed, the annular cam 114 may provide nearly but not quite enough movement. The first digit wheel of each numbering unit is moved by conventional pawl and ratchet mechanism, and the pawl motion caused by the annular cam is less than one tooth of the ratchet wheel, so that the pawl simply idles back and forth over a single tooth, without actually catching the next tooth. In Fig. 11 the rise of the cam groove 112 is shown at 190. The cam rollers of the operating arms distributed around the printing cylinder are shown by the small circles 110 in cam groove 112.

Referring now to Fig. 12, the web 92 passes beneath the printing cylinder 100 and is held thereagainst by the usual impression roller 192. Some of the rollers of the inking mechanism are shown at the top of Fig. 12, there being a roller 194 engaging rollers 196, 198, which in turn contact rollers 200, 202 as well as the printing cylinder 100. Rollers 200 and 202 run in contact with rollers 204, 206, which also engage printing cylinder 100. Thus the change of setting of the numbering units must take place between the printing point 208 and the inking point 210.

Reverting now to Fig. 11, it will be seen that the cam rise 190 is located in the said available zone. Moreover, when the axially shiftable cam 126 takes effect it rocks the arm 116 counterclockwise about rock shaft 118, and the latter is so located as to effectively increase the cam rise, that is, the bodily movement of the annular cam 114 at the rise 190 is approximately radial. The net result is that the movement of the cam roller 110 is increased enough for the pawl of the numbering unit to engage its next ratchet tooth, thus changing the setting as desired. The offset position of the annular cam 114 is maintained for exactly one revolution of the printing cylinder, thus insuring operation once, and only once, of each of the numbering units, and their operation is not simultaneous but sequential, so that each is permitted to print the last page of a book, and the change takes place for the next page.

The printing cylinder, numbering units and the air operated mechanism for the numbering units for press C, are identical with those just described for press B. The web leaving press B is printed as shown in Fig. 9, that is, the serial number, in this case the number 123, is printed on only alternate lines of stamps. However, the web leaving press C differs in having the same serial number 123 printed on the intermediate lines of stamps. Thus the cylinders in presses B and C are alike, but out of registration such that press C prints between the impressions printed by press B.

The apparatus also allows for a difference in phase resulting from the location along the web of press C relative to press B, and similarly for press B relative to press A. When stacking mechanism is used, allowance may be made for the relatively long web between press A and the stacking mechanism.

The mechanism for this purpose may be described with reference to Figs. 2 and 13-15. In Fig. 2 it is assumed that press A is used as a reference point (press A is itself in proper register with the preceding gravure press shown at 40 in Fig. 1, but that register is a simple register in no way involving page numbering). Press A is geared by means of sprocket wheel 212, chain 214, and sprocket wheel 216 to the input shaft 218 of phasing mechanism carried in a box 220. By using a two to one ratio between wheel 212 and wheel 216 the shaft 218 turns once for each page of stamps.

Referring now to Fig. 13, the shaft 218 is geared to a shaft 220 by reduction gearing, including pinion 222 meshing with gear 224 turning pinion 226 meshing with gear 228 on shaft 220. The gear reduction provided is at a 1:5 ratio. Shaft 220 is a slow speed cam shaft carrying a series of cams 230, 232 and 234. These operate micro switches or precision switches indicated at 236, 238 and 240 in Fig. 14. The input shaft 218 is itself a high speed cam shaft, it carrying a cam 242 which works a micro switch 244 (Fig. 15). Other cams shown are spares.

Reverting now to Fig. 2, the air cylinder (156 in Fig. 10) for axially shifting the cam (126 in Fig. 10) of press B, is controlled by a solenoid operated three-way air valve schematically shown at 250 (Fig. 2). The solenoid of the air valve is controlled by circuitry in box 252. This circuitry functions only when coincidentally energized through both of wires 254 and 256. Wire 254 is supplied from a counter 258, which in turn is pulsed by pulses from a switch 236. The counter 258 is set for twenty, and inasmuch as each rotation of press A corresponds to two pages in length of web, and inasmuch as switch 236 is operated by slow speed cam shaft 220 (Fig. 13), which turns only twice in five revolutions of the press, the output of counter 258 occurs only after one hundred pages.

Thus the circuitry in box 252 is prepared for operation on the passage of one hundred pages, but still does not actually operate the air valve 250 until precisely the desired instant which allows for phase displacement between press B and press A. This may be a matter of several page lengths, and in any case is well under the available difference allowed by one rotation of shaft 220 which corresponds to five page lengths. Therefore, by setting the cam of switch 238 at a point corresponding to the exact phase displacement between presses A and B, the air valve will be operated at the correct time.

The axially shiftable cam of press C is similarly controlled by a solenoid operated three-way air valve 260 (Fig. 2), the solenoid of which is controlled by circuitry in box 262. This functions only on coincident energization through wires 264 and 266. Wire 264 is connected to the counter 258 which counts out one hundred pages. The wire 266 is controlled by switch 240 operated by a cam on slow speed cam shaft 220. The phase displacement between press A and press C is less than the five pages accommodated by one rotation of the slow speed cam shaft 220, and consequently by properly setting the orientation of the cam (234 in Fig. 14) which operates the switch 240, the circuit in box 262 will become effective at the right instant, allowing for displacement along the web of press C, after the printing of one hundred pages at press A.

The stacker is changed from one stack corresponding to one book, to a next stack corresponding to a next book, under power of air operated means controlled by a solenoid operated air valve symbolized at 270 in Fig. 2. Its solenoid is controlled by circuitry contained in box 272. To make the valve function, this circuitry requires coincident energization of two lines 274 and 276. The line 274 is connected to the counter 258, and thus is prepared for operation after a count of one hundred pages. However, its actual operation is delayed until line 276 takes effect. This line is connected through a counter 278, which is set for the number of whole pages corresponding to the displacement between press A (Fig. 1) and the stacking point at belt 56. In the specific case shown, this may be about forty pages, and thus the counter 278 may be set to a corresponding value. However, the precise displacement, allowing for a fractional page, is determined by the rotative adjustment of a cam on the high speed cam shaft 218, which operates switch 244. The cam is shown at 242 in Fig. 13.

It has already been indicated that after the stacking of a desired number of books, in this case 1000 books (or 3000 when the web is three pages wide as here shown) an alarm is sounded and the press is shut down for manual change of the serial letters on the printing cylinder in press A. For this purpose, a counter is provided to count off the 1000 books, and such counter is indicated at 280, 282 in Fig. 2. It will be noted that this counter receives pulses from the counter 258, which itself counts the one hundred pages for each book, and thus the counter 280, 282 counts the number of books. A single counter might be used, but in the present case a relatively inexpensive commercially available type of counter is employed, which counts up to only 100 and accordingly two such counters are arranged in series.

These may be set in desired fashion, typically with one counter set at forty and the other at twenty-five, so that their product is one thousand. If counter 280 is set at forty, it sends a pulse to counter 282 for each forty books, and with the latter set at twenty-five, it will energize the line 284 after one thousand books. This line may be used for any desired purpose, for example, to sound an audible alarm or/and to light a visual alarm, or/and to operate an automatic shut-off for the press. In the latter case, however, a slight delay is introduced in order to permit the continued passage of part, but preferably not all of a book. This is to allow for the pages, say forty pages, between press A and the stacker. The press preferably is stopped promptly thereafter, in order not to unnecessarily advance the numbering units of presses B and C beyond what is wanted for the next book. For this purpose it is also possible to employ the line 284 to operate disabling mechanism or circuitry, which disables the air valves 250 and 260, so that the serial number remains unchanged even if the press line runs too long after completion of 1000 books.

It may be mentioned that the numbering units in press A for page numbering are preferably arranged to operate in reverse direction, that is, from 99 to 98, etc. (see Fig. 3), instead of from 00 to 01, etc., so that when the sheets are stacked on the stacking belt, they will appear with the small number on top and the large number on bottom, as is desired. It will be understood also that the reason the numbering is from 00 to 99, instead of 1 to 100, is that the latter numbering would require three digit wheels, with the third digit wheel used only once. Similar remark applies to the serial numbering from 000 to 999. To number from 1 to 1000 would require an otherwise unnecessary fourth digit wheel.

It will also be understood that a book need not necessarily have one hundred pages. In some cases, the books have fifty pages. These may be numbered 00 to 49, and the counter 258 (Fig. 2) is changed accordingly. The page numbering units on press A may be changed to repeat after the number 49. In other cases, a first book may be numbered 00 to 49 and the next book may be numbered 50 to 99, the books then being in pairs having fifty pages each. In such case, the numbering units on press A need not be changed, and it is sufficient to change counter 258 to count fifty pages.

The counters may be of various kinds, the particular ones here employed being reset counters sold commercially under the name "Microflex." The numbering units are center driven units manufactured by Wetter Numbering Machine Co. of New York. The air valves are Ross remote control three-way air valves. The circuitry in the boxes 252, 262, 272 for controlling the air valves has not been shown in detail, and any of a variety of known circuits may be employed for the purpose.

It is believed that the construction and operation of the present improved stamp printing apparatus, as well as the advantages thereof, will be apparent from the foregoing detailed description. The apparatus prints and stacks the pages for stamp books while working on a continuous web moving at very high speed through rotary machines. There is no need to stop or slow the web despite the change of the setting of the numbering units which is required at intervals and this change is preferably made in only a fraction of a revolution of a printing cylinder, so as to fit between a printing point and an inking point following shortly thereafter. The apparatus is so devised that numbering units of sturdy and ample dimension, and preferably of known commercial manufacture, may be used despite the very small dimension of the individual stamps. Although the press line is of substantial length, and may include many operations, appropriate phasing and counting mechanism is provided to cause the successive operations along the web to remain in proper registration.

It will be understood that while the invention has been

I claim:

1. Rotary printing apparatus for printing serial numbers on stamps which numbers are repeated for a desired quantity of stamps and then changed, said apparatus comprising a printing cylinder carrying a plurality of numbering units around its periphery, operating means for advancing the setting of said units, a cam engaging all of said operating means during one revolution of said cylinder, but normally so positioned as not to advance the setting of said units, and means to bodily displace said cam at the desired quantity, for a time corresponding to one revolution of the cylinder, in order to operate all of the operating means once each.

2. Rotary printing apparatus for printing serial numbers on stamps, which numbers are repeated for a desired quantity of stamps and then changed, said apparatus comprising a printing cylinder carrying a plurality of axially extending lines of numbering units around its periphery, operating arms with cam followers for advancing the setting of said lines of units, a cam engaging all of said operating arms during one revolution of each cylinder, but normally so positioned as not to advance the setting of said units, and means to bodily displace said cam radially at the desired quantity, for a time corresponding to one revolution of the cylinder, in order to successively operate all of the operating arms once each.

3. Rotary printing apparatus comprising two cylinders and cams as defined in claim 1, operating successively on a single web, one cylinder having numbering units for printing alternate stamps, and the other having numbering units for printing the intermediate stamps, and having means to displace the cam of the second cylinder later than the means for the first cylinder by a phase displacement corresponding to the spacing along the web between the first and second cylinders.

4. Rotary printing apparatus for printing serial numbers on stamps which numbers are repeated for a desired quantity of stamps and then changed, said apparatus comprising a printing cylinder carrying a plurality of numbering units around its periphery, operating means for advancing the setting of said units, a cam engaging all of said operating means during one revolution of said cylinder for displacing the same partially but not fully enough to advance the setting of the numbering units, and means to bodily displace said cam radially at the desired quantity for a time corresponding to one revolution of the cylinder enough to cause the operating means to advance the setting of the numbering units in order to operate all of the operating means once each.

5. Rotary printing apparatus for printing serial numbers on stamps which numbers are repeated for a desired quantity of stamps and then changed, said apparatus comprising a printing cylinder carrying a plurality of numbering units around its periphery, inking means for inking the numbering units on said cylinder, operating means for advancing the setting of said units, a cam engaging said operating means for displacing the same partially but not fully enough to advance the setting of the numbering units, and means to bodily displace said cam radially at the desired quantity for a time corresponding to one revolution of the cylinder enough to cause the operating means to advance the setting of the numbering units in order to operate all of the operating means once each, whereby the change of setting may be made at high speed in only a fraction of a revolution of the cylinder between the printing point and the inking point.

6. Rotary printing apparatus for printing serial numbers on stamps which numbers are repeated for a desired quantity of stamps and then changed, said apparatus comprising a printing cylinder carrying a plurality of axially extending lines of numbering units around its periphery, operating arms with cam followers for advancing the setting of said lines of units, a cam engaging all of said operating arms during one revolution of each cylinder and for displacing the same nearly but not quite enough to advance the setting of the numbering units, and means to bodily displace said cam radially at the desired quantity for a time corresponding to one revolution of the cylinder enough to cause the operating arms to advance the setting of the numbering units in order to operate all of the operating arms once each.

7. Rotary printing apparatus for printing serial numbers on stamps which numbers are repeated for a desired quantity of stamps and then changed, said apparatus comprising a printing cylinder carrying a plurality of axially extending lines of numbering units around its periphery, inking means for said cylinder, operating arms with cam followers for inking the numbering units on advancing the setting of said lines of units, a cam engaging said operating arms and for displacing the same nearly but not quite enough to advance the setting of the numbering units, and means to bodily displace said cam radially at the desired quantity for a time corresponding to one revolution of the cylinder enough to cause the operating arms to advance the setting of the numbering units in order to operate all of the operating arms once each, whereby the change of setting may be made at high speed in only a fraction of a revolution of the cylinder between the printing point and the inking point.

8. Rotary printing apparatus comprising two printing cylinders and cams as defined in claim 4, operating successively on a single web, one cylinder having numbering units for printing alternate stamps, and the other having numbering units for the printing of intermediate stamps, and in which the means to displace the cam of the second cylinder is made operative later than the means for the first cylinder by a phase displacement corresponding to the spacing along the web between the first and second cylinders.

9. Rotary printing apparatus comprising two printing cylinders and cams as defined in claim 5, operating successively on a single web, one cylinder having numbering units for printing alternate stamps, and the other having numbering units for printing the intermediate stamps, and in which the means to displace the cam of the second cylinder is made operative later than the means for the first cylinder by a phase displacement corresponding to the spacing along the web between the first and second cylinders.

10. Rotary printing apparatus comprising two printing cylinders and cams as defined in claim 6, operating successively on a single web, one cylinder having numbering units for printing alternate stamps, and the other having numbering units for printing the intermediate stamps, and in which the means to displace the cam of the second cylinder is made operative later than the means for the first cylinder by a phase displacement corresponding to the spacing along the web between the first and second cylinders.

11. Rotary printing apparatus comprising two printing cylinders and cams as defined in claim 7, operating successively on a single web, one cylinder having numbering units for printing alternate stamps, and the other having numbering units for printing the intermediate stamps, and in which the means to displace the cam of the second cylinder is made operative later than the means for the first cylinder by a phase displacement corresponding to the spacing along the web between the first and second cylinders.

12. Rotary printing apparatus as defined in claim 1, in which the means to displace the operating cam comprises a cam follower, an axially shiftable cam together with means to drive the same from the cylinder at a slightly stepped up gear ratio of say 5 to 4, an appropriate portion of the periphery of the shiftable cam, say four-fifths, being of uniform radius for displacement of the operating cam, and shift means to shift the shiftable cam into and out of operative relation with its cam follower, said shift means functioning while the follower is at the remaining periphery of the shiftable cam, say one-fifth.

13. Rotary printing apparatus as defined in claim 4, in which the means to displace the operating cam comprises a cam follower, an axially shiftable cam together with means to drive the same from the cylinder at a slightly stepped up gear ratio of say 5 to 4, an appropriate portion of the periphery of the shiftable cam, say four-fifths, being of uniform radius for displacement of the operating cam, and shift means to shift the shiftable cam into and out of operative relation with its cam follower, said shift means functioning while the follower is at the remaining periphery of the shiftable cam, say one-fifth.

14. Rotary printing apparatus as defined in claim 7, in which the means to displace the operating cam comprises a cam follower, an axially shiftable cam together with means to drive the same from the cylinder at a slightly stepped up gear ratio of say 5 to 4, an appropriate portion of the periphery of the shiftable cam, say four-fifths, being of uniform radius for displacement of the operating cam, and shift means to shift the shiftable cam into and out of operative relation with its cam follower, said shift means functioning while the follower is at the remaining periphery of the shiftable cam, say one-fifth.

15. Rotary printing apparatus for printing books of sheets of stamps, said apparatus comprising a first letter press to print serial letters on each stamp, and page numbers at intervals corresponding to the page length, a second letter press the cylinder of which carries numbering units around its periphery to print a common serial number on the individual stamps, electrically controlled means for advancing the setting of the numbering units of the second letter press, a counter for counting the pages desired for a book, say one hundred pages, a phasing switch for compensating for the spacing along the web of the second letter press from the first letter press, and circuitry interconnecting the electrically controlled means, the counter, and the phasing switch, said circuitry requiring coincidence of both the counter and the phasing switch to become effective.

16. Rotary printing apparatus for printing books of sheets of stamps, said apparatus comprising a first letter press to print serial letters on each stamp and page numbers at intervals corresponding to the page length, a second letter press the cylinder of which carries numbering units around its periphery to print a common serial number on alternate individual stamps, a third letter press the cylinder of which carries numbering units around its periphery to print the same serial number on the intermediate individual stamps, electrically controlled means for advancing the setting of the numbering units of the second letter press, electrically controlled means for advancing the setting of the numbering units of the third letter press, a counter for counting the pages desired for a book, say one hundred pages, phasing switches for compensating for the spacing along the web of the second and third letter presses from the first letter press, and circuitry interconnecting the electrically controlled means, the counters and the phasing switches, said circuitry requiring coincidence of both the counter and the phasing switch to become effective.

17. Rotary printing apparatus for printing books of sheets of stamps, said apparatus comprising a gravure printing press to engrave the background of the stamps, a first letter press to print serial letters on each stamp and page numbers at intervals corresponding to the page length, a second letter press the cylinder of which carries numbering units around its periphery to print a common serial number on alternate individual stamps, a third letter press the cylinder of which carries numbering units around its periphery to print the same serial number on the intermediate individual stamps, electrically controlled means for advancing the setting of the numbering units of the second letter press, electrically controlled means for advancing the setting of the numbering units of the third letter press, a counter for counting the pages desired for a book, say one hundred pages, cam controlled phasing switches for compensating for the spacing along the web of the second and third letter presses from the first letter press, and circuitry interconnecting the electrically controlled means, the counters and the cam controlled phasing switches, said circuitry requiring coincidence of both the counter and the phasing switch to become effective, and additional counter means to indicate the completion of a series of books having the same serial letters, say, one thousand books.

18. Rotary printing apparatus for printing books of sheets of stamps, said apparatus comprising a first letter press to print serial letters on each stamp and page numbers at intervals corresponding to the page length, a second letter press the cylinder of which carries numbering units around its periphery to print a common serial number on individual stamps, additional apparatus for slitting the web, for perforating the web to outline the individual stamps, for cutting the web into individual pages, and for stacking the cut pages in stacks corresponding to books, electrically controlled means for advancing the setting of the numbering units of the second letter press, electrically controlled means at the stacking unit to separate a stack corresponding to one book from that corresponding to the next, a counter for counting the pages desired for a book, say one hundred pages, phasing switches for compensating for the spacing along the web of the second letter press from the first letter press, and similar means including also a counter for compensating for the spacing along the web of the stacker, and circuitry interconnecting the electrically controlled means, the counters and the phasing switches, said circuitry requiring coincidence of both the counter and the phasing switch to become effective for each electrically controlled means.

19. Rotary printing apparatus for printing books of sheets of stamps, said apparatus comprising a first letter press to print serial letters on each stamp and page numbers at intervals corresponding to the page length, a second letter press the cylinder of which carries numbering units around its periphery to print a common serial number on alternate individual stamps, a third letter press the cylinder of which carries numbering units around its periphery to print the same serial number on the intermediate individual stamps, additional apparatus for slitting the web, for perforating the web to outline the individual stamps, for cutting the web into individual pages, and for stacking the cut pages in stacks corresponding to books, electrically controlled means for advancing the setting of the numbering units of the second letter press, electrically controlled means for advancing the setting of the numbering units of the third letter press, electrically controlled means at the stacking unit to separate a stack corresponding to one book from that corresponding to the next, a counter for counting the pages desired for a book, say one hundred pages, phasing switches for compensating for the spacing along the web of the second and third letter presses from the first letter press, similar means including also a counter for compensating for the spacing along the web of the stacker, and circuitry interconnecting the electrically controlled means, the counters and the phasing switches, said circuitry requiring coincidence of both the counter and the phasing switch to become effective for each of the aforesaid three electrically controlled means.

20. Rotary printing apparatus for printing books of sheets of stamps, said apparatus comprising a gravure printing press to engrave the background of the stamps, a first letter press to print serial letters on each stamp and page numbers at intervals corresponding to the page length, a second letter press the cylinder of which carries numbering units around its periphery to print a common serial number on alternate individual stamps, a third letter press the cylinder of which carries numbering units around its periphery to print the same serial number on the intermediate individual stamps, additional apparatus for slitting the web, for perforating the web to outline the individual stamps, for cutting the web into individual pages, and for stacking the cut pages in stacks corresponding to books, electrically controlled means for advancing the setting of the numbering units of the second letter press, electrically controlled means for advancing the setting of the numbering units of the third letter press, electrically controlled means at the stacking unit to separate a stack corresponding to one book from that corresponding to the next, a counter for counting the pages desired for a book, say one hundred pages, cam controlled phasing switches for compensating for the spacing along the web of the second and third letter presses from the first letter press, similar means including also a counter for compensating for the spacing along the web of the stacker, and circuitry interconnecting the electrically controlled means, the counters and the cam controlled phasing switches, said circuitry requiring coincidence of both the counter and the phasing switch to become effective for each of the aforesaid three electrically controlled means, and additional counter means to indicate the completion of a series of books having the same serial letters, say one thousand books.

References Cited in the file of this patent

UNITED STATES PATENTS

| | | |
|---|---|---|
| 381,105 | Black | Apr. 17, 1888 |
| 1,200,758 | Pringle | Oct. 10, 1916 |
| 1,480,395 | Johnston | Jan. 8, 1924 |
| 1,500,424 | Smith | July 8, 1924 |
| 1,920,232 | Allen | Aug. 1, 1933 |
| 2,154,884 | Anstee | Apr. 18, 1939 |
| 2,475,804 | Rouan | July 12, 1949 |
| 2,655,098 | Dutro | Oct. 13, 1953 |

FOREIGN PATENTS

| | | |
|---|---|---|
| 400,208 | Great Britain | Oct. 18, 1933 |